(12) United States Patent
Hsu et al.

(10) Patent No.: US 11,847,100 B2
(45) Date of Patent: Dec. 19, 2023

(54) DISTRIBUTED FILE SYSTEM SERVICING RANDOM-ACCESS OPERATIONS

(71) Applicant: Alibaba Group Holding Limited, Grand Cayman (KY)

(72) Inventors: Windsor Hsu, San Jose, CA (US); Jiesheng Wu, Redmond, WA (US)

(73) Assignee: Alibaba Group Holding Limited, George Town (KY)

( * ) Notice: Subject to any disclaimer, the term of this patent is extended or adjusted under 35 U.S.C. 154(b) by 44 days.

(21) Appl. No.: 16/953,197

(22) Filed: Nov. 19, 2020

(65) Prior Publication Data

US 2022/0156230 A1    May 19, 2022

(51) Int. Cl.
| | |
|---|---|
| G06F 16/182 | (2019.01) |
| G06F 9/54 | (2006.01) |
| G06F 16/18 | (2019.01) |

(52) U.S. Cl.
CPC .......... *G06F 16/183* (2019.01); *G06F 9/547* (2013.01); *G06F 16/1805* (2019.01); *G06F 16/1827* (2019.01)

(58) Field of Classification Search
None
See application file for complete search history.

(56) References Cited

U.S. PATENT DOCUMENTS

| | | | |
|---|---|---|---|
| 8,151,082 B2 | 4/2012 | Flynn et al. | |
| 8,880,788 B1 * | 11/2014 | Sundaram | G06F 3/0643 711/103 |
| 9,159,419 B2 | 10/2015 | Nellans et al. | |
| 9,170,754 B2 | 10/2015 | Flynn et al. | |
| 9,342,574 B2 | 5/2016 | Kan et al. | |
| 9,606,914 B2 | 3/2017 | Thatcher et al. | |
| 10,019,320 B2 | 7/2018 | Talagala et al. | |
| 10,599,407 B2 | 3/2020 | Meixner | |
| 10,725,983 B2 | 7/2020 | Larson et al. | |
| 10,817,421 B2 | 10/2020 | Talagala et al. | |
| 10,817,502 B2 | 10/2020 | Talagala et al. | |
| 2010/0198889 A1 * | 8/2010 | Byers | G06F 3/0659 707/827 |

(Continued)

*Primary Examiner* — Hosain T Alam
*Assistant Examiner* — Anthony G Gemignani
(74) *Attorney, Agent, or Firm* — Lee & Hayes, P.C.

(57) ABSTRACT

Methods and systems implement local file systems of computing nodes which translate random-access read and random-access write operation calls to append-based operation calls in accordance with a distributed file system ("DFS") implemented across storage nodes of a cloud network. Computer-executable applications running on the computing nodes may generate kernel-level read and write system calls by application programming interfaces ("APIs") such as the Portable Operating System Interface ("POSIX") standard, to a local file system. The local file system may translate these read and write system calls to file operations at a DFS implementing an append-only file system, as well as perform storage reclamation upon the DFS periodically and/or upon storage thresholds being exceeded. Storage for computing workloads on the computing nodes may be decoupled from individual computing nodes, in comparison to conventional architectures for computing clusters and storage clusters in cloud networks, enabling storage to be scaled without static allocations.

20 Claims, 8 Drawing Sheets

(56) References Cited

U.S. PATENT DOCUMENTS

2018/0275889 A1\* 9/2018 Matthew .............. G06F 12/0246
2020/0204626 A1\* 6/2020 Zhang ..................... G06F 3/061
2020/0293213 A1\* 9/2020 Haridas ................... G06F 3/067

\* cited by examiner

400

LOCAL FILE SYSTEM RUNNING ON COMPUTING NODE OF CLOUD NETWORK RECEIVES RANDOM-ACCESS FILE WRITE OPERATION CALL REFERENCING DATA TO BE WRITTEN TO LOCAL FILE
402

LOCAL FILE SYSTEM TRANSLATES FILE WRITE OPERATION CALL TO FIRST APPEND OPERATION CALL TARGETING DISTRIBUTED FILE SYSTEM ("DFS") HOSTED ON PLURALITY OF STORAGE NODES OF CLOUD NETWORK
404

LOCAL FILE SYSTEM RECEIVES APPEND LOCATION FROM DFS IN RESPONSE TO APPEND CALL
406

LOCAL FILE SYSTEM CREATES MAPPING BETWEEN LOCAL FILE AND APPEND LOCATION
408

LOCAL FILE SYSTEM RECORDS MAPPING BETWEEN LOCAL FILE AND APPEND LOCATION BY SECOND APPEND OPERATION CALL TARGETING DFS
410

```
┌─────────────────────────────────────────────────────────────────────┐
│ LOCAL FILE SYSTEM RUNNING ON COMPUTING NODE OF CLOUD NETWORK RECEIVES│
│ RANDOM-ACCESS FILE READ OPERATION CALL REFERENCING DATA TO BE READ FROM│
│                            LOCAL FILE                                │
│                               502                                    │
└─────────────────────────────────────────────────────────────────────┘
                                  ↓
┌─────────────────────────────────────────────────────────────────────┐
│ LOCAL FILE SYSTEM LOOKS UP, AT DISTRIBUTED FILE SYSTEM ("DFS") HOSTED ON│
│ PLURALITY OF STORAGE NODES OF CLOUD NETWORK, MAPPING BETWEEN LOCAL FILE│
│                  AND APPEND LOCATION AT DFS                          │
│                               504                                    │
└─────────────────────────────────────────────────────────────────────┘
                                  ↓
┌─────────────────────────────────────────────────────────────────────┐
│ LOCAL FILE SYSTEM TRANSLATES FILE READ OPERATION CALL TO APPEND READ │
│         OPERATION CALL TARGETING APPEND LOCATION AT DFS              │
│                               506                                    │
└─────────────────────────────────────────────────────────────────────┘
                                  ↓
┌─────────────────────────────────────────────────────────────────────┐
│ LOCAL FILE SYSTEM RECEIVES DATA RETURNED BY DFS IN RESPONSE TO APPEND READ│
│                         OPERATION CALL                               │
│                               508                                    │
└─────────────────────────────────────────────────────────────────────┘
```

```
┌─────────────────────────────────────────────────────────────┐
│ LOCAL FILE SYSTEM RUNNING ON COMPUTING NODE OF CLOUD NETWORK│
│ IS TRIGGERED TO PERFORM STORAGE RECLAMATION AT DFS HOSTED ON│
│           PLURALITY OF STORAGE NODES OF CLOUD NETWORK       │
│                              602                            │
└─────────────────────────────────────────────────────────────┘
                              ↓
┌─────────────────────────────────────────────────────────────┐
│  LOCAL FILE SYSTEM DETERMINES EXISTING LOCAL FILES IN       │
│              NAMESPACE OF LOCAL FILE SYSTEM                 │
│                              604                            │
└─────────────────────────────────────────────────────────────┘
                              ↓
┌─────────────────────────────────────────────────────────────┐
│  LOCAL FILE SYSTEM LOOKS UP, AT DISTRIBUTED FILE SYSTEM     │
│  ("DFS"), MAPPINGS BETWEEN EXISTING LOCAL FILES AND APPEND  │
│    LOCATIONS OF FIRST SEQUENTIAL DATA STRUCTURE AT DFS      │
│                              606                            │
└─────────────────────────────────────────────────────────────┘
                              ↓
┌─────────────────────────────────────────────────────────────┐
│ LOCAL FILE SYSTEM CAUSES DFS TO WRITE SECOND SEQUENTIAL DATA│
│ STRUCTURE COMPRISING DATA REFERENCED BY EACH APPEND LOCATION│
│  TO WHICH EACH EXISTING LOCAL FILE IS MAPPED BY FILE COPY   │
│              OPERATION CALL TARGETING DFS                   │
│                              608                            │
└─────────────────────────────────────────────────────────────┘
                              ↓
┌─────────────────────────────────────────────────────────────┐
│ LOCAL FILE SYSTEM CAUSES DFS TO UPDATE EACH MAPPING BETWEEN │
│  EXISTING LOCAL FILE AND APPEND LOCATION OF FIRST SEQUENTIAL│
│  DATA STRUCTURE TO MAPPING BETWEEN EXISTING LOCAL FILE AND  │
│     APPEND LOCATION OF SECOND SEQUENTIAL DATA STRUCTURE     │
│                              610                            │
└─────────────────────────────────────────────────────────────┘
                              ↓
┌─────────────────────────────────────────────────────────────┐
│ LOCAL FILE SYSTEM CAUSES DFS TO FREE STORAGE OCCUPIED BY    │
│            FIRST SEQUENTIAL DATA STRUCTURE                  │
│                              612                            │
└─────────────────────────────────────────────────────────────┘
```

FIG. 6

DISTRIBUTED FILE SYSTEM SERVICING RANDOM-ACCESS OPERATIONS

BACKGROUND

Data storage has increasingly entered the domain of cloud computing, wherein the hosting of file systems on networked, distributed servers allows availability and reliability of remotely stored files to be greatly enhanced, and enables data workloads to be serviced by likewise distributed computing resources, which may be scaled to meet the needs of large-scale computation applications and projects. As a consequence, it is desired for a distributed file system ("DFS") to establish access to files in a manner common to, and integrated with, local file systems.

For example, common computer-executable applications which run in user space of an operating system ("OS") are programmed to generate kernel-level read and write system calls by application programming interfaces ("APIs") such as the Portable Operating System Interface ("POSIX") standard. POSIX calls generally assume reads and writes to local file system that stores data at local disk storage, wherein, to some extent, read and write system calls may access files at random addresses ("random-access reads" and "random-access writes"). On conventional disk storage such as hard drives, while random-access writes may incur substantial performance penalties, it is known in the art how a computing system may be optimized for such local write performance.

In contrast, DFS is generally implemented as an append-only file system. It is known in the art that an append-only file system offers certain benefits but there remains a need to provide random-access-write file storage for use by certain applications. On cloud computing platforms from vendors such as cloud computing and cloud services vendors, nodes responsible for computing workloads are provisioned with multiple, heterogeneous file systems, which may include local file system and/or DFS, wherein local file system storing data in either local storage attached to computational nodes, or networked storage mounted to computational nodes, may be implemented in addition to DFS to service random-access writes. However, the implementation of dedicated storage for individual nodes hinders the scalability of storage resources to different computing tasks. It is desired to overcome such limitations of existing DFS implementations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates a flowchart of a random-access write translation method according to example embodiments of the present disclosure.

FIG. 5 illustrates a flowchart of a random-access read translation method according to example embodiments of the present disclosure.

FIG. 6 illustrates a flowchart of a storage reclamation method according to example embodiments of the present disclosure.

DETAILED DESCRIPTION

Systems and methods discussed herein are directed to implementing distributed file systems, and more specifically implementing local file systems of computing nodes which translate random-access read and random-access write operation calls to append-based operation calls in accordance with a distributed file system implemented across storage nodes of a cloud network.

Figure 1:
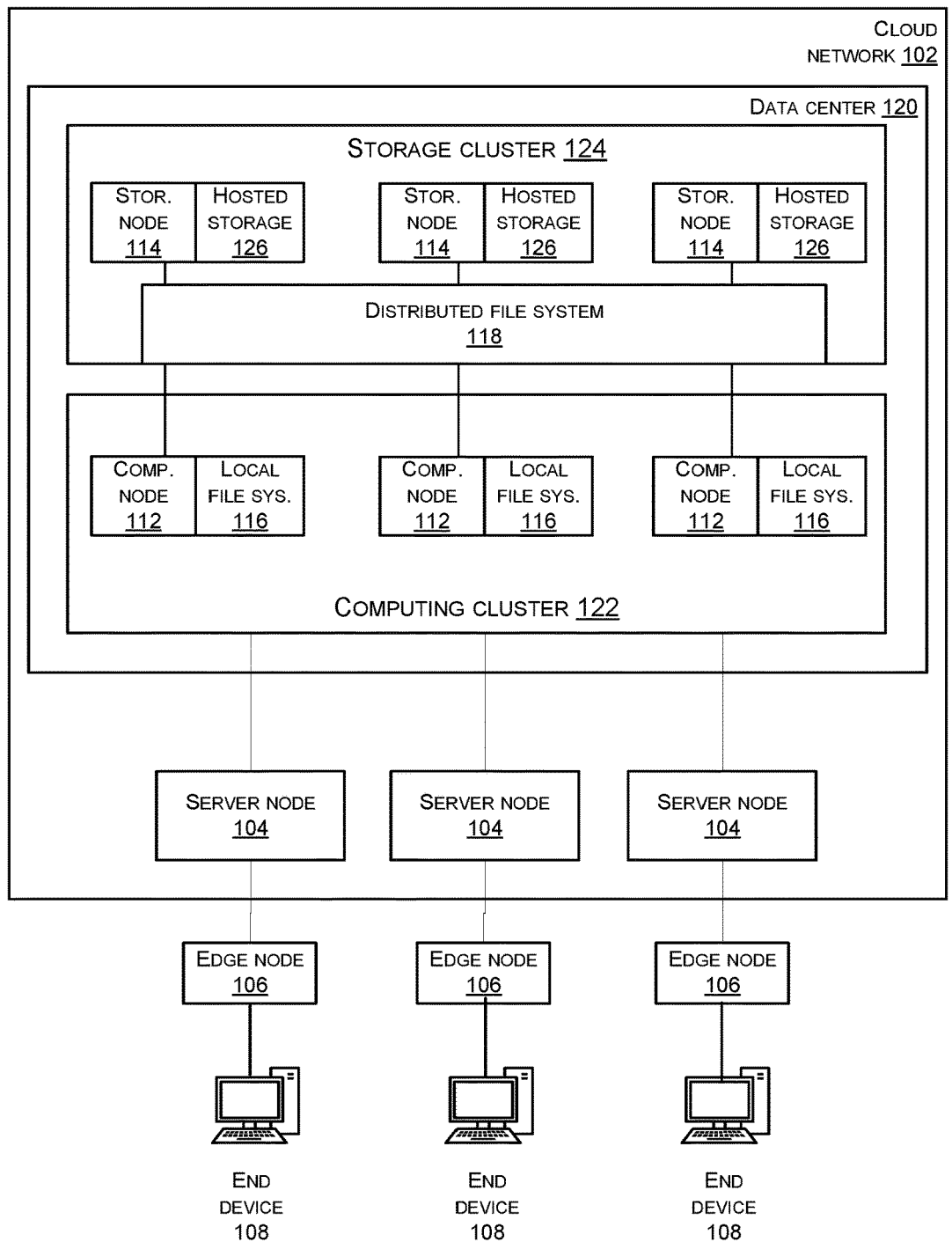
FIG. 1 illustrates an architectural diagram of a computing system according to example embodiments of the present disclosure.

FIG. 1 illustrates an architectural diagram of a computing system 100 according to example embodiments of the present disclosure. The computing system 100 may be a cloud computing system, which may provide collections of servers hosting storage resources and computing resources to provide distributed file systems, distributed and parallel computing, improved availability of physical or virtual storage resources and computing resources, and such benefits.

The computing system 100 may be implemented over a cloud network 102 of physical or virtual server nodes 104(1), 104(2), . . . 104(N) (where any unspecified server node may be referred to as a server node 104) connected by physical or virtual network connections. Furthermore, the network 102 may terminate at physical or virtual edge nodes 106(1), 106(2), . . . 106(N) (where any unspecified edge node may be referred to as an edge node 106) located at physical and/or logical edges of the cloud network 102. The edge nodes 106(1) to 106(N) may connect to any number of end devices 108(1), 108(2), . . . 108(N) (where any unspecified end device may be referred to as an end device 108).

At least some server nodes 104 of the cloud network 102 may be computing nodes 112, and at least some server nodes 104 of the cloud network 102 may be storage nodes 114.

Computing nodes 112 may be organized into any number of computing clusters 122. Each computing node 112 may implement a local file system 116, as shall be described subsequently, servicing a random-access write data storage workload. Each computing node 112 may further host service(s) responsible for a computing workload, or a portion of a distributed computing workload, where each such workload may generate data to be written to storage, such as at hosted storage of one or more storage nodes 114 in manners as shall be described subsequently.

The hosted services may be accessed over network connections by some number of end devices 108, which may act as clients of the hosted services in utilizing computing resources of the computing nodes 112 to perform computing tasks. The computing nodes 112 may, in turn, act as clients of a distributed file system ("DFS") hosted at one or more storage clusters 124, in utilizing the DFS as an extension of, or the entirety of, storage for computing tasks executed by those computing nodes 112 in manners as known to persons skilled in the art.

Storage nodes 114 may be organized into any number of storage clusters 124. A distributed file system ("DFS 118") may be implemented across storage nodes of a storage cluster 124 by implementation of an append-only file system, such as a log-structured file system, at each storage node 114 making up a storage cluster. Some number of storage clusters may be hosted at one or more data centers 120, where a data center 120 may include some number of storage nodes 114 logically organized into some number of storage clusters. A data center 120 may service file read and write operations transmitted over a network by local file systems of any number of computing nodes 112 of any number of computing clusters, the local file systems acting as clients of the DFS 118, by dynamically allocating any number of storage clusters to provide storage volumes for one or more computing tasks which generate the file read and write operations.

According to implementations of a DFS, within a storage cluster, storage nodes 114 therein may include a master node and multiple chunk nodes. A DFS 118 hosted at a storage node 114 of a storage cluster may configure both the master node of the storage cluster, and each chunk node of the storage cluster, to each communicate with any number of clients of the DFS 118 (including local file systems of any number of computing nodes 112 of any number of computing clusters of the cloud network 102) by any number of network connections according to a file system communication protocol which implements one or more application programming interfaces ("APIs") providing read and write calls. File operation calls include, for example, API calls which cause an OS running on each chunk node to create files, delete files, read from files, write to files, rename files, move a file from one location to another location in a file system hierarchy, and the like.

Physical and/or virtual storage ("hosted storage 126") may be hosted at each storage node 114. For example, the physical and/or virtual storage may be hosted at one or more chunk nodes of a storage cluster. Data may be stored as logical blocks of a predetermined size, which may each be individually referred to as a "chunk." The DFS 118 may configure the chunk nodes, in conjunction, to create multiple replicas of each individual chunk of data, where individual replicas may be stored distributed on multiple chunk nodes, providing redundancy and increasing availability of all chunks of data stored at the storage cluster.

The DFS 118 may further configure each chunk node to perform memory operations and disk operations upon the hosted storage 126. For example, a chunk node may be configured to read data stored on hosted storage 126, write data to hosted storage 126, copy data from one address to another or from one logical block to another on hosted storage 126, move data from one address to another or from one logical block to another on hosted storage 126, and the like. Such disk operations may be performed by a DFS in manners as known to persons skilled in the art.

The DFS 118 may further configure a master node to store metadata pertaining to locations of each block of data among the chunk nodes. The metadata may provide mapping between files according to a file system hierarchy (as defined by the DFS 118) and each block of data making up the file, including replicas thereof as located amongst the chunk nodes.

File system communication protocols as described herein may implement APIs such as Portable Operating System Interface ("POSIX"), Filesystem in Userspace ("FUSE"), Network File System ("NFS"), Representational State Transfer ("REST") APIs, and the like.

Hosted storage 126 may include various forms of computer-readable storage media, which may include volatile memory (such as random-access memory ("RAM")) and/or non-volatile memory (such as read-only memory ("ROM"), flash memory, storage class memory, etc). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

According to example embodiments of the present disclosure, hosted storage 126 may at least include some number of physical and/or virtual storage devices implemented at least in part using flash memory, such as solid-state drives ("SSDs").

By implementation of a computing system 100 as described above, computing tasks which include some number of computer-executable instructions may originate locally from end devices 108, which may make hosted service API calls to computing nodes 112 of a computing cluster, causing those computing nodes 112 to execute the computer-executable instructions making up the computing tasks. The execution of the computer-executable instructions may configure local file systems of the computing nodes 112, as DFS clients, to make file operation API calls to the DFS 118 implemented on storage nodes 114 of one or more storage clusters, including master nodes and chunk nodes. Data generated by the execution of the computer-executable instructions making up the computing tasks may then be stored at the chunk nodes in chunks, in some number of replicas.

Figure 2:
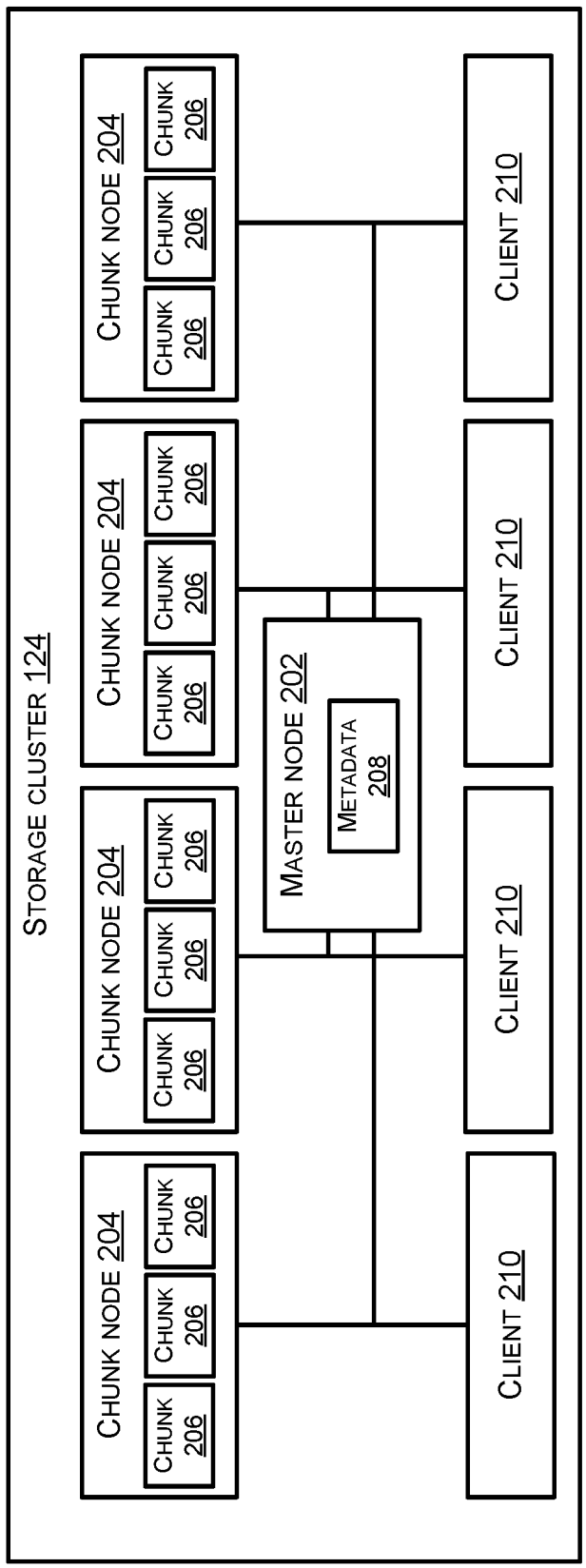
FIG. 2 illustrates an architectural diagram of storage nodes of a storage cluster according to example embodiments of the present disclosure.

FIG. 2 illustrates an architectural diagram of storage nodes of a storage cluster 124 according to example embodiments of the present disclosure. Illustrated are the master node 202 and some number of chunk nodes 204. Each chunk node 204 stores some number of chunks 206, where any chunk stored on an individual chunk node 204 may be a straight replica or an erasure encoded replica of at least some number of other chunks stored on other individual chunk nodes 204. The master node 202 stores metadata 208 which provides mapping between files according to a file system hierarchy (as defined by the DFS 118) and each block of data making up the file, including replicas thereof as located amongst the chunk nodes 204.

Clients 210 of the DFS 118 hosted on the storage nodes 114 may be respective local file systems of any computing system performing computational tasks and utilizing the DFS hosted on the storage nodes 114 as extensions of local storage, in place of local storage, in the capacity of virtualizing local storage, and the like. For example, clients 210 may be local file systems of server nodes 104 of a cloud network 102 other than the storage nodes 114, such as computing nodes 112 of the cloud network 102.

Each chunk node 204 may be configured to perform disk operations such as reading data stored on hosted storage 126, writing data to hosted storage 126, copying data from one address to another or from one logical block to another on hosted storage 126, moving data from one address to another or from one logical block to another on hosted storage 126, and the like. Each such disk operation may be performed by calls to a DFS 118 of a respective chunk node 204.

According to example embodiments of the present disclosure, a DFS 118 may be implemented as an append-only file system (such as a log-structured file system), wherein each modification of data stored in a local file system of a node of the DFS 118 may be stored as an append to a head of a sequential data structure such as a log. Thus, for a DFS 118 to perform any kind of file operation wherein data is modified, an append call may be made to the DFS to cause the append-only file system of the DFS 118 to write an append to a head of such a sequential data structure, the append reflecting modifications to be made by the file operation. According to example embodiments of the present disclosure, it should be understood that such calls to the DFS 118 may be made from any client 210 as described herein; thus, such calls to the DFS 118 may be made from a local file system of a different node of the DFS 118, or such calls to the DFS 118 may be made from the same local file system which is ultimately caused to write the append. Furthermore, such calls may be made by the execution of computing workload instructions 302, and not from any local file system, as shall be described subsequently with reference to FIG. 3. Moreover, such calls may be made as a result of translation of a file write operation call received by any of the above clients, as shall be described subsequently with reference to FIG. 4.

It is known to persons skilled in the art to implement heterogeneous file systems, based on heterogeneous combinations of local and/or hosted storage, to support different file operation API calls by computing nodes of a cloud network as described above. For example, according to techniques as known to persons skilled in the art, a DFS may be implemented over local storage at some number of computing nodes of a cloud network, such that an append-only file system may be virtualized collectively over part of the local storage of the disparate computing nodes. However, not the entirety of local storage of the computing nodes is virtualized in this manner; in addition to the above, part of the local storage of the disparate computing nodes may be accessed through a local file system implemented on the local storage, the local file system supporting random-access reads and random-access writes. Thus, some read and write calls generated by computer-executable instructions running on the computing nodes may be passed to the DFS by the local file system and may be serviced in a distributed manner across local storage of disparate computing nodes, while other read and write calls generated by computer-executable instructions running on the computing nodes may be passed to the local file system and may be serviced by the local storage.

Alternatively, according to techniques as known to persons skilled in the art, a DFS may be implemented over local storage at some number of storage nodes of a cloud network, such that an append-only file system may be virtualized collectively over local storage of some of the disparate storage nodes. However, the local storage of other storage nodes is not virtualized in this manner; in addition to the above, some of the disparate storage nodes may be virtualized collective as networked storage, which may be mounted on some number of computing nodes such that they may be accessed through a local file system implemented at those computing nodes, the local file system supporting random-access reads and random-access writes. Thus, some read and write calls generated by computer-executable instructions running on the computing nodes may be passed to the DFS by the local file system and may be serviced in a distributed manner across local storage of disparate storage nodes, while other read and write calls generated by computer-executable instructions running on the computing nodes may be passed to the local file system and may be serviced by the local storage of disparate storage nodes virtualized as network storage.

In both of the above cases, the underlying storage architecture of the cloud network presents challenges in scaling storage provided to computing nodes of the cloud network. In the first case, local storage is fixed in its physical capacity, and thus cannot be arbitrarily expanded and scaled in accordance with computing workloads, and may remain static in size as workload increases. In the second case, while network storage is not necessarily fixed in physical capacity allocated to computing nodes, the partitioning of network storage between each local file system and the DFS remains static and thus presents a limitation which may prevent the network storage from being evenly utilized between each local file system and the DFS. Consequently, in both cases, it is challenging to implement scaling storage in accordance with changing computing workloads due to the limitation of dedicated storage being provided to for a local file system supporting random-access reads and random-access writes.

Consequently, based upon a computing system implementing DFS at some number of storage nodes servicing some number of computing nodes as described herein, example embodiments of the present disclosure provide heterogeneous file systems based on non-heterogeneous hosted storage, enabling hosted storage to be decoupled from computational node clients, and enabling a common hosted storage pool to service file read and write operations made to heterogeneous file systems.

According to example embodiments of the present disclosure, a local file system 116 implemented at some number of computing nodes 116 of a computing cluster, and a DFS 118 implemented at some number of storage nodes 114 of storage cluster, may implement APIs such as Portable Operating System Interface ("POSIX"), Filesystem in Userspace ("FUSE"), Network File System ("NFS"), Representational State Transfer ("REST") APIs, and the like. These APIs, facing the local file system 116 in its capacity as a client of the DFS 118, may provide abstractions which hide physical and logical organization of underlying hosted storage from the local file system 116.

Figure 3:
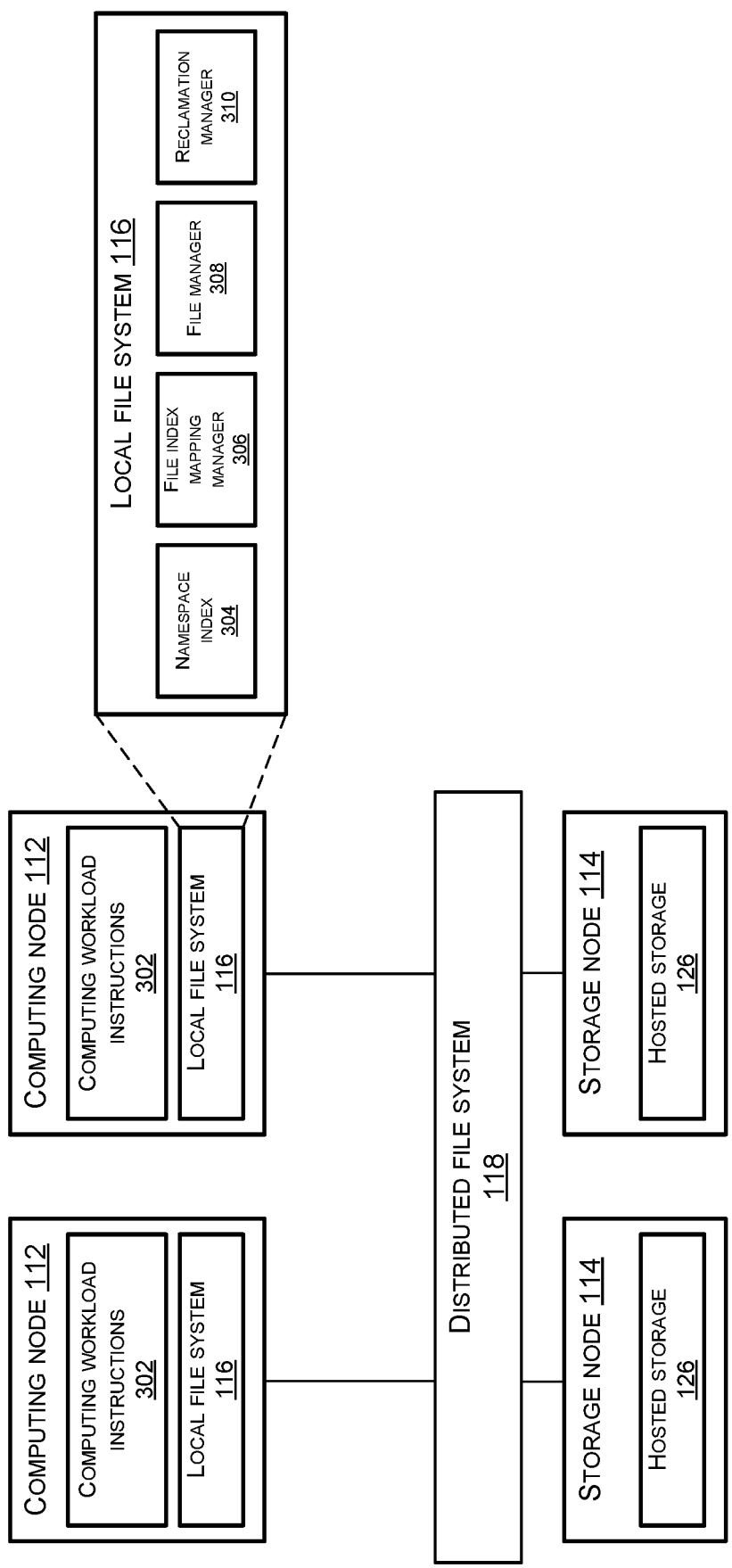
FIG. 3 illustrates a detailed view of a local file system implemented at one or more computing nodes according to example embodiments of the present disclosure.

FIG. 3 illustrates a detailed view of a local file system 116 implemented at one or more computing nodes 112 according to example embodiments of the present disclosure.

According to example embodiments of the present disclosure, a local file system 116 may be implemented by one or more sets of computer-executable instructions running in kernel space of the computing node 112, such that the instructions are loaded into memory during or immediately after booting of the computing node 112, and the instructions may interface with OS-level read and write calls which are otherwise hidden from applications running in user space.

However, alternatively, a local file system 116 need not be implemented in a kernel of a computing node 112. A local file system 116 may be implemented by one or more sets of computer-executable instructions running in user space of the computing node 112.

As described above, computing nodes 112 further execute one or more sets of computer-executable instructions making up various computing tasks. For clarity, these instructions shall be referred to as computing workload instructions 302 as illustrated in FIG. 3, to be distinguished from the computer-executable instructions implementing the local file system 116. However, computing workload instructions 302 may run in user space of the computing node 112, regardless of whether the local file system 116 runs in kernel space or in user space.

The execution of computing workload instructions 302 may require reads and writes to files stored at hosted storage of any number of storage nodes of storage clusters as described above. Thus, the computing workload instructions 302 may generate file operation calls in accordance with various file system APIs such as POSIX, FUSE, NFS, and the like. Furthermore, computing workload instructions 302 corresponding to a same computing task may generate file operation calls in accordance with two or more file system APIs, which may be, respectively, supported by a local file system 116 and a DFS 118. For example, file operation calls which cause random-access reads and/or random-access writes may be in accordance with a first file system API (such as, for example, POSIX), and file operations which do not cause either random-access reads or random-access writes may be in accordance with a second file system API supported by a DFS 118.

According to example embodiments of the present disclosure, the computing workload instructions 302 may interface with the local file system 116 by standard file system API calls (that is, a first file system API as referenced above), which may be kernel-level API calls supported by an operating system running on the computing node 112.

According to example embodiments of the present disclosure, in the event that the local file system 116 runs in kernel space, the local file system 116 may replace certain standard file system API calls, causing the standard file system API calls to configure the computing node 112 to run computer-executable instructions as defined by the local file system 116.

According to example embodiments of the present disclosure, in the event that the local file system 116 runs in user space, the local file system 116 may not be able to replace any standard file system API calls, and may not be able to define any API calls having the same names as standard file system API calls. Instead, according to example embodiments of the present disclosure, the computing node 112 may further be configured with indirect symbol resolution of at least some standard file system API calls.

Indirect symbol resolution, as defined here according to example embodiments of the present disclosure, may refer to one of several possible mechanisms by which standard file system API calls being executed by the computing node 112 may configure the computing node 112 to run instructions different than the computer-executable instructions executed by those API calls during normal operation. For example, indirect symbol resolution may be implemented as a dynamic linker, such as the LD_PRELOAD environmental variable in Unix-based operating systems, which may configure the computing node 112 to override certain file system API calls. Alternatively, indirect symbol resolution may be implemented as a module implemented according to FUSE or other virtual file system APIs as known to persons skilled in the art which are operative to translate standard file system API calls in accordance with a hierarchy of a virtual file system.

Indirect symbol resolution according to example embodiments of the present disclosure may merely be a first level of indirection, wherein standard file system API calls are translated to API calls of the local file system; another level of indirection, as shall be described subsequently, may translate API calls of the local file system to API calls compatible with a DFS, as shall be described subsequently.

The execution of computing workload instructions by a computing node 112 may configure the computing node 112 to make local file operation API calls to the local file system 116, and configure the local file system 116, as a DFS client, to make distributed file operation API calls to the DFS 118 implemented on storage nodes 114 of one or more storage clusters, including master nodes 202 and chunk nodes 204. The local file system 116, as a DFS client, may then translate the local file operation API calls to further distributed file operation API calls to the DFS. Consequently, according to example embodiments of the present disclosure, in both cases, data generated by the execution of the computing workload instructions may then be stored at the chunk nodes 204 in chunks, in some number of replicas.

The local file system 116 as illustrated in FIG. 3 further includes a namespace index 304, a file offset mapping manager 306, a file manager 308, and a reclamation manager 310. The operation of the local file system 116 and the components thereof, in accomplishing the outcomes as described above, are described in further detail subsequently.

Additionally, according to example embodiments of the present disclosure, the computing workload instructions 302 may interface with the DFS 118 by a second file system API as referenced above. The computing workload instructions 302 may generate file operation calls which cause appends to an append-only file system, instead of random-access file operations, and these append operation calls may be passed to the DFS 118 directly, bypassing the local file system 116.

FIG. 4 illustrates a flowchart of a random-access write translation method 400 according to example embodiments of the present disclosure. The random-access translation method may be implemented at local file systems 116 of computing nodes 112 of computing clusters of a cloud network 102 as described herein according to example embodiments of the present disclosure.

At a step 402, a local file system running on a computing node of a cloud network receives a random-access file write operation call referencing data to be written to a local file.

According to example embodiments of the present disclosure, a random-access file write operation call may be understood as a file write operation API call configured to write data to an offset of a file. The random-access file write operation call may be handled by a file manager 308, which may maintain a file state describing whether the file is open, as known to persons skilled in the art.

According to various file system APIs as described herein, a variety of API calls may include a file offset as a parameter.

It may be understood that a file write operation API call having a file offset as a parameter is configured to write data to an offset of a file. Furthermore, it may be understood that a file write operation API call which is called after another file operation API call which specifies an offset position in an open file at which a subsequent read operation or write operation should be performed, such as a seek call, is also configured to write data to an offset of a file. Thus, a random-access file write operation API call may or may not include a file offset as a parameter; the context of prior file operation API calls received by the local file system may also enable a random-access file write operation API call to be identified.

It should be understood that a "local file" as referred herein may be a virtual file logically represented by the local file system of the computing node, which need not correspond to any data stored locally at the computing node. Instead, the "local file" may merely refer to logical mappings to data stored at some number of storage nodes hosting a DFS, as described subsequently.

Moreover, it should be understood that such file write operation calls may originate from any node of the cloud network, including the same computing node as referenced with regard to step 402, or any other computing node; thus, a translation as described subsequently with regard to step 404 may be performed upon a file write operation call originating from any such computing node of the cloud network.

At a step 404, the local file system translates the file write operation call to a first append operation call targeting a DFS hosted on a plurality of storage nodes of the cloud network. The local file system may perform this step in a capacity as a distributed file system ("DFS") client.

As described above, storage nodes may be organized into any number of storage clusters. A DFS may be implemented across storage nodes of a storage cluster by implementation of an append-only file system, such as a log-structured file system, at each storage node making up a storage cluster. Some number of storage clusters may be hosted at one or more data centers, where a data center may include some number of storage nodes logically organized into some number of storage clusters. A data center may service file read and write operations transmitted over a network by any number of computing nodes of any number of computing clusters, by dynamically allocating any number of storage clusters to provide storage volumes for one or more computing tasks which generate the file read and write operations.

Append operations performed upon data to be written, according to a DFS, may cause the data to be written to be appended to a head of a sequential data structure such as a log. Thus, for a DFS to write data to a file, an append operation call to the DFS may be made to cause the local file system on a node of the DFS to write an append to a head of such a sequential data structure, the append reflecting the data to be written to the file.

It should be understood that, according to example embodiments of the present disclosure, not all append operation calls to a DFS necessarily originate from translation of a file write operation call by the local file system; as described above, other append operation calls may originate directly from computing workload instructions, bypassing the local file system. Thus, the DFS as described herein may receive native append operation calls at any time, concurrently to, and independently from, first and second append operation calls as described herein with reference to FIG. 4.

Such native append operation calls may be handled in a manner similar to first and second append operation calls as described herein.

It should further be understood that the DFS may receive first append operation calls and second append operation calls from local file systems of any number of computing nodes of the cloud network, each computing node acting independently of each other computing node.

At a step 406, the local file system receives an append location from the DFS in response to the append call. The local file system may perform this step in a capacity as a DFS client.

For example, the local file system may receive a message from the DFS hosted on the plurality of storage nodes, indicating success or failure of the append operation call. According to subsequent steps of the method 400, it may be assumed that append operation call returned in success. The append location may be returned as part of a message from the DFS indicating success of the append operation call.

At a step 408, the local file system creates a mapping between the local file and the append location.

A file offset mapping manager 306 as described above with reference to FIG. 3 may handle the creation of the mapping between the local file and the append location.

According to example embodiments of the present disclosure, since the file write operation API call was configured to write data to an offset of a file, a reference to the file, in conjunction with the offset, may be mapped together to a reference to the append location returned by the DFS. By such a mapping, the local file system may subsequently determine that data logically found in the referenced file at the offset, according to the local file system, may be located at the DFS in an append identified by the append location.

The mapping between the local file and the append location (which may be referred to equivalently as the mapping between the append location and the local file) may be recorded, by the file offset mapping manager 306, as an entry in a mapping data structure stored by metadata of the DFS, where the mapping data structure includes any number of such mappings wherein entries may be looked up by key identifying a reference to a local file and an offset. For example, the mapping data structure may be an array, a map, a dictionary, a table, a tree, and such data structures as known to persons skilled in the art. An entry in the mapping data structure indexed by a key which includes a reference to a particular file (and, optionally, includes a particular offset) may be created in this step in the event that an entry for that particular key does not yet exist, or such an entry may be updated in the event that an entry for that particular key already exists.

At a step 410, the local file system records the mapping between the local file and the append location by a second append operation call targeting the DFS. The local file system may perform this step in a capacity as a DFS client.

Thus, the mapping data structure as referenced above may also be stored by an append-only file system as described above, and recording the mapping between the local file and the append location may be performed by either creating a new entry in the mapping data structure or updating an existing entry in the mapping data structure, accordingly. Both creating a new entry in the mapping data structure and updating an existing entry in the mapping data structure may be performed by writing an append to a head of a sequential data structure, the append reflecting the entry to be created or the entry to be updated.

Thereafter, the random-access write translation method 400 has completed the process of translating a random-access write, by a local file system, to operations at a DFS according to an append-only file system.

FIG. 5 illustrates a flowchart of a random-access read translation method 500 according to example embodiments of the present disclosure. The random-access translation method may be implemented at local file systems 116 of computing nodes 112 of computing clusters of a cloud network 102 as described herein according to example embodiments of the present disclosure.

At a step 502, a local file system running on a computing node of a cloud network receives a random-access file read operation call referencing data to be read from a local file.

According to example embodiments of the present disclosure, a random-access file read operation call may be understood as a file read operation API call configured to read data from an offset of a file. The random-access file read operation call may be handled by a file manager 308, which may maintain a file state describing whether the file is open, as known to persons skilled in the art.

According to various file system APIs as described herein, a variety of API calls may include a file offset as a parameter. It may be understood that a file read operation API call having a file offset as a parameter is configured to read data from an offset of a file. Furthermore, it may be understood that a file read operation API call which is called after another file operation API call which specifies an offset position in an open file at which a subsequent read operation or write operation should be performed, such as a seek call, is also configured to read data to an offset of a file. Thus, a random-access file read operation API call may or may not include a file offset as a parameter; the context of prior file operation API calls received by the local file system may also enable a random-access file read operation API call to be identified.

It should be understood that a "local file" as referred herein may be a virtual file logically represented by the local file system of the computing node, which need not correspond to any data stored locally at the computing node. Instead, the "local file" may merely refer to logical mappings to data stored at some number of storage nodes hosting a DFS, as described subsequently.

Moreover, it should be understood that such file read operation calls may originate from any node of the cloud network, including the same computing node as referenced with regard to step 502, or any other computing node; thus, a translation as described subsequently with regard to step 506 may be performed upon a file read operation call originating from any such computing node of the cloud network.

At a step 504, the local file system looks up, at a DFS hosted on a plurality of storage nodes of the cloud network, a mapping between the local file and an append location at the DFS. The local file system may perform this step in a capacity as a DFS client.

A mapping between a local file and an append location (which may be referred to equivalently as the mapping between an append location and a local file) may be recorded, by the file offset mapping manager 306, as an entry in a mapping data structure stored by metadata of the DFS, where the mapping data structure includes any number of such mappings wherein entries may be looked up by key identifying a reference to a local file and an offset. For example, the mapping data structure may be an array, a map, a dictionary, a table, a tree, and such data structures as known to persons skilled in the art. An entry in the mapping data structure may be looked up by a key which includes a reference to a particular file (and, optionally, includes a particular offset), in the event that an entry for that particular key already exists.

Storage nodes of a cloud network may be organized into any number of storage clusters. A DFS may be implemented across storage nodes of a storage cluster by implementation of an append-only file system, such as a log-structured file system, at each storage node making up a storage cluster. Some number of storage clusters may be hosted at one or more data centers, where a data center may include some number of storage nodes logically organized into some number of storage clusters. A data center may service file read and write operations transmitted over a network by any number of computing nodes of any number of computing clusters, by dynamically allocating any number of storage clusters to provide storage volumes for one or more computing tasks which generate the file read and write operations.

According to example embodiments of the present disclosure, since the local file system of the computing node may be configured to write data to offsets of local files, a reference to the file, in conjunction with the offset, mapped together to a reference to an append location at the DFS may identify data of an append to a sequential data structure stored at the DFS which logically corresponds to data previously written to offsets of local files at the local file system. By such a mapping, the local file system may determine that data logically found in the referenced file at the offset, according to the local file system, may be located at the DFS in an append identified by the append location.

The mapping data structure as referenced above may also be stored by an append-only file system as described above, and the mapping between the local file and the append location may be recorded writing any number of appends to a head of a sequential data structure, each append reflecting creation of a new entry in the mapping data structure or updating of an existing entry in the mapping data structure.

At a step 506, the local file system translates the file read operation call to an append read operation call targeting the append location at the DFS. The local file system may perform this step in a capacity as a DFS client.

Append read operations performed upon append locations, according to a DFS, may cause data located at an append to a sequential data structure such as a log, as identified by the append location, to be read. Thus, for a DFS to read data from an append, an append read call to the DFS may be made to cause the local file system on a node of the DFS to read an append to a sequential data structure, the append reflecting data to be read from a file represented by one or more appends of the sequential data structure.

At a step 508, the local file system receives data returned by the DFS in response to the append read operation call. The local file system may perform this step in a capacity as a DFS client.

Thereafter, the random-access read translation method 500 has completed the process of translating a random-access read, by a local file system, to operations at a DFS according to an append-only file system.

FIG. 6 illustrates a flowchart of a storage reclamation method 600 according to example embodiments of the present disclosure. The storage reclamation method may be implemented at local file systems 116 of computing nodes 112 of computing clusters of a cloud network 102 as described herein according to example embodiments of the present disclosure. Steps below may be performed by modules of a reclamation manager 310 as described above with reference to FIG. 3.

At a step 602, a local file system running on a computing node of a cloud network is triggered to perform storage reclamation at a DFS hosted on a plurality of storage nodes of the cloud network.

Storage reclamation may be triggered by one or more trigger conditions being met. For example, a trigger condition may be a periodic timer reaching a preset time. Alternatively and/or additionally, a trigger condition may be total occupied storage space at the DFS (i.e., some amount of occupied storage space distributed over any number of the storage nodes, logically organized into the same DFS) exceeding some preset threshold ratio of the total size of the local files.

At a step 604, the local file system determines existing local files in a namespace of the local file system.

For example, the local file system may traverse a namespace index 304 stored by the local file system 116 as illustrated in FIG. 3, and iteratively determine whether each symbol of the namespace index 304 resolves. Each symbol that resolves may be determined as corresponding to an existing file. Each symbol that fails to resolve may be disregarded, and, by subsequent steps of the storage reclamation method 600, blocks of a DFS that may have been previously occupied by data corresponding to symbols that fail to resolve may be subsequently resolved for use.

At a step 606, the local file system looks up, at the DFS, mappings between the existing local files and append locations of a first sequential data structure at the DFS. The local file system may perform this step in a capacity as a DFS client.

A mapping between a local file and an append location (which may be referred to equivalently as the mapping between an append location and a local file) may be recorded as an entry in a mapping data structure which includes any number of such mappings wherein entries may be looked up by key identifying a reference to a local file and an offset. For example, the mapping data structure may be an array, a map, a dictionary, a table, and such data structures as known to persons skilled in the art. An entry in the mapping data structure may be looked up by a key which includes a reference to a particular file (and, optionally, includes a particular offset), in the event that an entry for that particular key already exists.

Storage nodes of a cloud network may be organized into any number of storage clusters. A DFS may be implemented across storage nodes of a storage cluster by implementation of an append-only file system, such as a log-structured file system, at each storage node making up a storage cluster. Some number of storage clusters may be hosted at one or more data centers, where a data center may include some number of storage nodes logically organized into some number of storage clusters. A data center may service file read and write operations transmitted over a network by any number of computing nodes of any number of computing clusters acting as clients of the DFS, by dynamically allocating any number of storage clusters to provide storage volumes for one or more computing tasks which generate the file read and write operations.

According to example embodiments of the present disclosure, since the local file system of the computing node may be configured to write data to offsets of local files, a reference to the file, in conjunction with the offset, mapped together to a reference to an append location at the DFS may identify data stored at the DFS which logically corresponds to data previously written to offsets of local files at the local file system. By such a mapping, the local file system may determine that data logically found in the referenced file at the offset, according to the local file system, may be located at the DFS in an append to a sequential data structure identified by the append location. Iteratively, the local file system may determine each append location which corresponds to existing local files; multiple append locations across a sequential data structure may correspond to the same existing local file.

The mapping data structure as referenced above may also be stored by an append-only file system as described above, and the mapping between the local file and the append location may be recorded writing any number of appends to a head of a sequential data structure, each append reflecting creation of a new entry in the mapping data structure or updating of an existing entry in the mapping data structure.

At a step 608, the local file system causes the DFS to write a second sequential data structure comprising data referenced by each append location to which each existing local file is mapped by a file copy operation call targeting the DFS. The local file system may perform this step in a capacity as a DFS client.

The sequential data structure may be written by copy operations performed upon each append location, such that data located at each append to an existing sequential data structure of the DFS, such as a log, as identified by the append locations, is copied to the new sequential data structure. Further appends to the existing data structure which do not are not identified by the append locations will not be copied to the new sequential data structure.

Such an operation, wherein appends identified by the append locations are copied and appends not identified by the append locations are not copied in writing a new sequential data structure, may be provided by a novel file copy operation call of a DFS implemented according to example embodiments of the present disclosure.

At a step 610, the local file system causes the DFS to update each mapping between an existing local file and an append location of the first sequential data structure to a mapping between the existing local file and an append location of the second sequential data structure. The local file system may perform this step in a capacity as a DFS client.

The mapping between the local file and the append location (which may be referred to equivalently as the mapping between the append location and the local file) may be recorded, by the file offset mapping manager 306, as an entry in a mapping data structure stored by metadata of the DFS, where the mapping data structure includes any number of such mappings wherein entries may be looked up by key identifying a reference to a local file and an offset. For example, the mapping data structure may be an array, a map, a dictionary, a table, a tree, and such data structures as known to persons skilled in the art. Entries from a mapping data structure of the first sequential data structure may be copied to the second sequential data structure, updated so that they refer to append locations of the second sequential data structure rather than append locations of the first sequential data structure.

At a step 612, the local file system causes the DFS to free storage occupied by the first sequential data structure. The local file system may perform this step in a capacity as a DFS client.

For example, the DFS may mark each block occupied by the first sequential data structure as being safe for overwriting with subsequently written data.

Thereafter, the storage reclamation method 600 has completed the process of reclaiming storage distributed across storage nodes of the cloud network previously occupied by appends of the first sequential data structure which corresponded to non-existing local files of the local file system. The second sequential data structure no longer occupies storage with these stale appends, and storage occupied by the first sequential data structure may now be freed for subsequent write operations.

Figure 7:
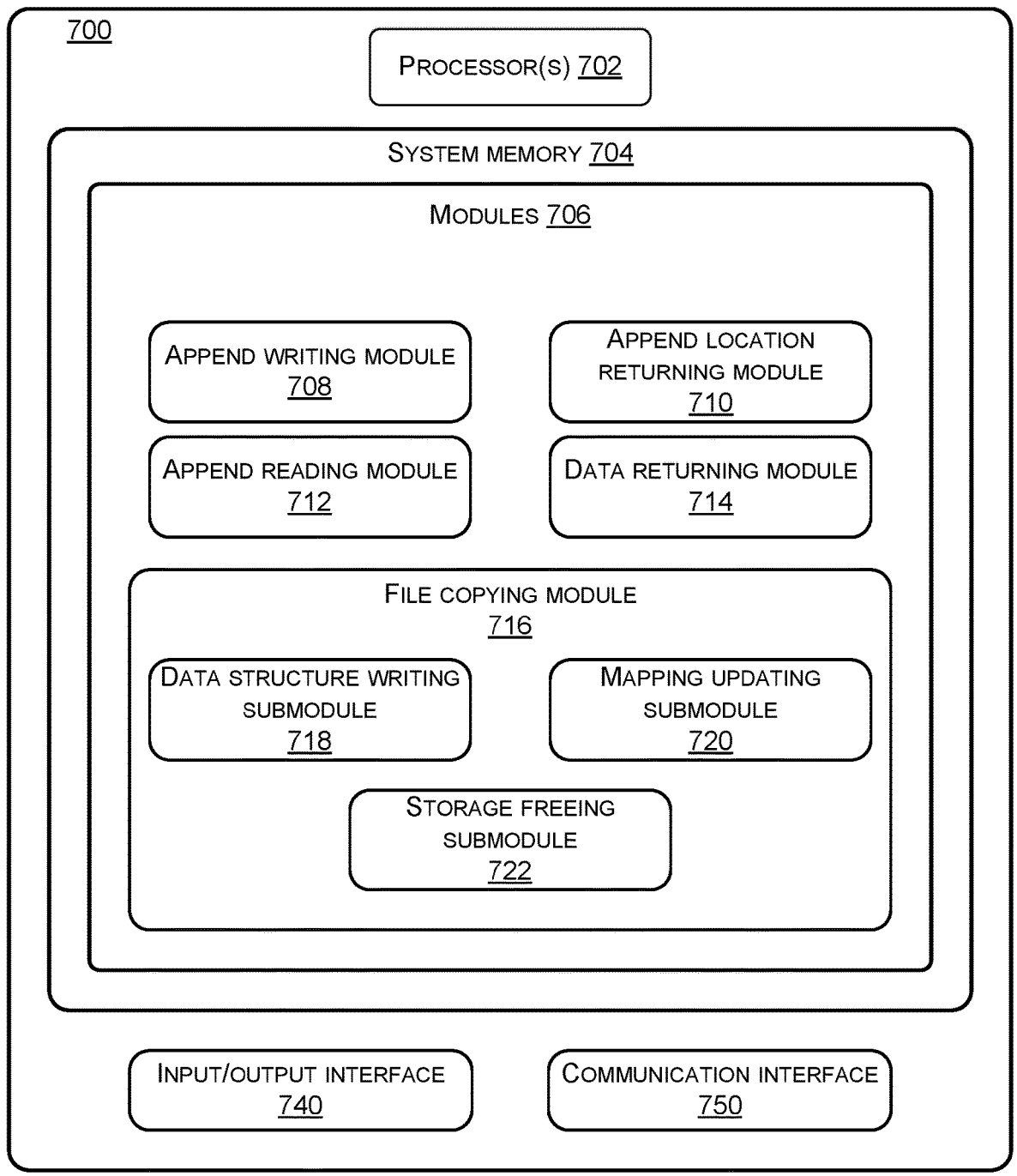
FIG. 7 illustrates an example distributed file system for implementing the processes and methods described herein.

FIG. 7 illustrates an example distributed file system 700 for implementing the processes and methods described above.

The techniques and mechanisms described herein may be implemented by multiple instances of the system 700, as well as by any other computing device, system, and/or environment. The system 700 may be a single computing system or an edge host providing physical or virtual computing resources as known by persons skilled in the art. Examples thereof include at least one node of a DFS node cluster as described herein. The system 700 shown in FIG. 7 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 700 may include one or more processors 702 and system memory 704 communicatively coupled to the processor(s) 702. The processor(s) 702 and system memory 704 may be physical or may be virtualized and/or distributed. The processor(s) 702 may execute one or more modules and/or processes to cause the processor(s) 702 to perform a variety of functions. In embodiments, the processor(s) 702 may include a central processing unit ("CPU"), a graphics processing unit ("GPU"), both CPU and GPU, or other processing units or components known in the art. Additionally, each of the processor(s) 702 may possess its own local memory, which also may store program modules, program data, and/or one or more operating systems.

Depending on the exact configuration and type of the system 700, the system memory 704 may be volatile, such as RAM, non-volatile, such as ROM, flash memory, miniature hard drive, memory card, and the like, or some combination thereof. The system memory 704 may include one or more computer-executable modules 706 that are executable by the processor(s) 702.

The modules 706 may include, but are not limited to, an append writing module 708, an append location returning module 710, an append reading module 712, a data returning module 714, and a file copying module 716. The file copying module 716 may further include a data structure writing submodule 718, a mapping updating submodule 720, and a storage freeing submodule 722.

The append writing module 708 may be configured to, in response to an append operation call, perform a first append operation, a second append operation, and a native append operation as described above with reference to FIG. 4.

The append location returning module 710 may be configured to return an append location as described above with reference to FIG. 4.

The append reading module 712 may be configured to, in response to an append read operation call, perform an append read operation as described above with reference to FIG. 5.

The data returning module 714 may be configured to return data read from an append as described above with reference to FIG. 5.

The data structure writing submodule 718 may be configured to write a second sequential data structure as described above with reference to FIG. 6.

The mapping updating submodule 720 may be configured to update mappings as described above with reference to FIG. 6.

The storage freeing submodule 722 may be configured to free storage as described above with reference to FIG. 6.

The system 700 may additionally include an input/output (I/O) interface 740 and a communication module 750 allowing the system 700 to communicate with other systems and devices over a network, such as the cloud network as described above with reference to FIG. 1. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 8:
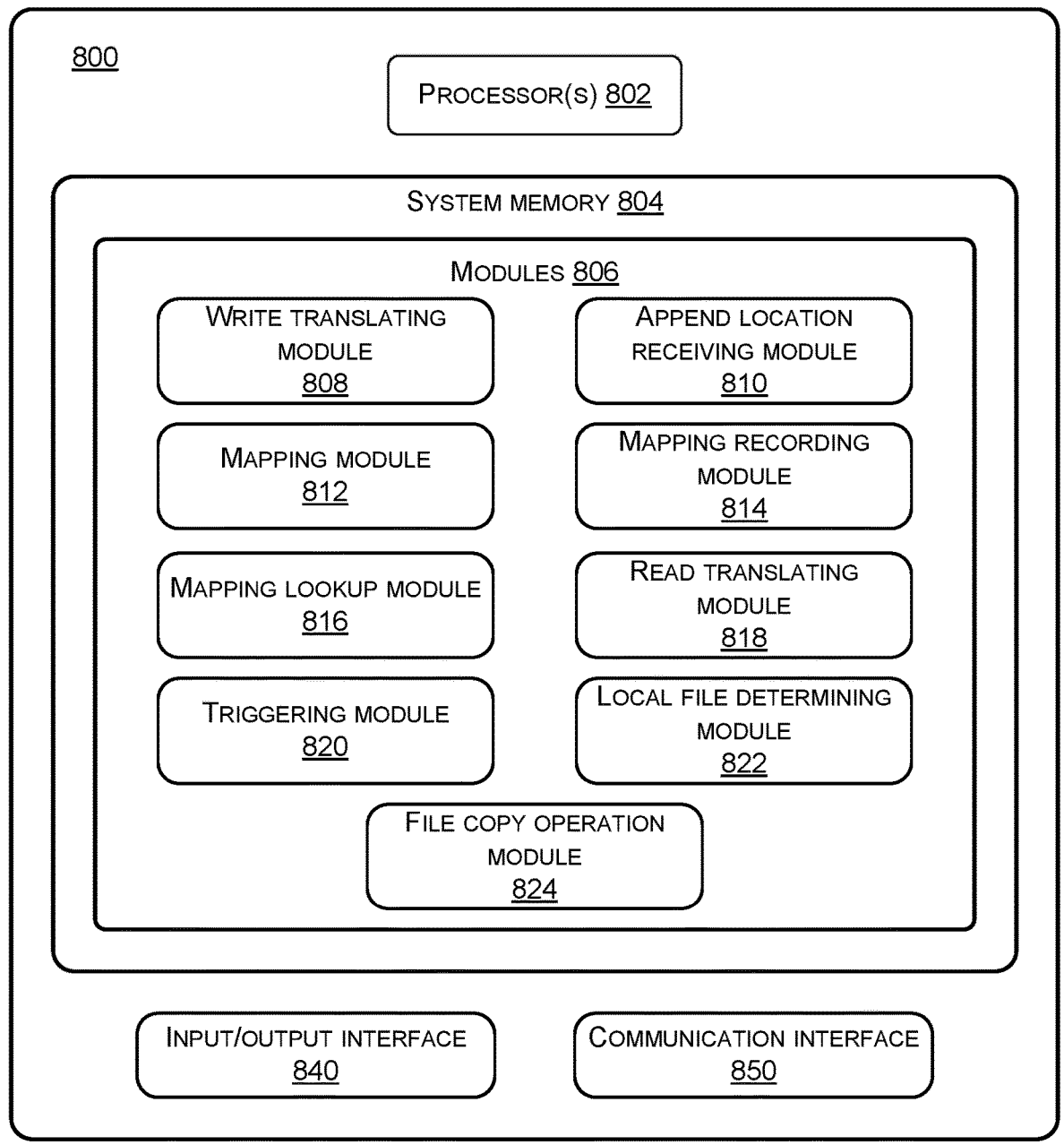
FIG. 8 illustrates an example computing node system for implementing the processes and methods described herein.

FIG. 8 illustrates an example computing node system 800 for implementing the processes and methods described herein.

The techniques and mechanisms described herein may be implemented by multiple instances of the system 800, as well as by any other computing device, system, and/or environment. The system 800 may be a single computing system or an edge host providing physical or virtual computing resources as known by persons skilled in the art. Examples thereof include at least one node of a DFS node cluster as described herein. The system 800 shown in FIG. 8 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 800 may include one or more processors 802 and system memory 804 communicatively coupled to the processor(s) 802. The processor(s) 802 and system memory 804 may be physical or may be virtualized and/or distributed. The processor(s) 802 may execute one or more modules and/or processes to cause the processor(s) 802 to perform a variety of functions. In embodiments, the processor(s) 802 may include a central processing unit ("CPU"), a graphics processing unit ("GPU"), both CPU and GPU, or other processing units or components known in the art. Additionally, each of the processor(s) 802 may possess its own local memory, which also may store program modules, program data, and/or one or more operating systems.

Depending on the exact configuration and type of the system 800, the system memory 804 may be volatile, such as RAM, non-volatile, such as ROM, flash memory, miniature hard drive, memory card, and the like, or some combination thereof. The system memory 804 may include one or more computer-executable modules 806 that are executable by the processor(s) 802.

The modules 806 may include, but are not limited to, a write translating module 808, an append location receiving module 810, a mapping module 812, a mapping recording module 814, a mapping lookup module 816, a read translating module 818, a triggering module 820, a local file determining module 822, and a file copy operation module 824.

The write translating module 808 may be configured to translate a file write operation call to an append operation call targeting a DFS as described above with reference to FIG. 4.

The append location receiving module 810 may be configured to receive an append location as described above with reference to FIG. 4.

The mapping module 812 may be configured to create a mapping between a local file and an append location as described above with reference to FIG. 4.

The mapping recording module 814 may be configured to record a mapping between a local file and an append location by an append operation call targeting a DFS as described above with reference to FIG. 4.

The mapping lookup module 816 may be configured to looks up a mapping between a local file and an append location at a DFS as described above with reference to FIGS. 5 and 6.

The read translating module 818 may be configured to translate a file read operation call to an append read operation call targeting an append location at a DFS as described above with reference to FIG. 5.

The triggering module 820 may be configured to trigger a local file system to perform storage reclamation at a DFS as described above with reference to FIG. 6.

The local file determining module 822 may be configured to determine existing local files in a namespace of a local file system as described above with reference to FIG. 6.

The file copy operation module 824 may be configured to invoke a file copy operation call targeting a DFS, causing the DFS to write a sequential data structure; to update mappings; and to free storage as described above with reference to FIG. 6.

The system 800 may additionally include an input/output (I/O) interface 840 and a communication module 850 allowing the system 800 to communicate with other systems and devices over a network, such as the cloud network as described above with reference to FIG. 1. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides local file systems of computing nodes which translate random-access read and random-access write operation calls to append-based operation calls in accordance with a distributed file system ("DFS") implemented across storage nodes of a cloud network. Computer-executable applications running on the computing nodes may generate kernel-level read and write system calls by application programming interfaces ("APIs") such as the Portable Operating System Interface ("POSIX") standard, to a local file system. The local file system may translate these read and write system calls to file operations at a DFS implementing an append-only file system, as well as perform storage reclamation upon the DFS periodically and/or upon storage thresholds being exceeded. Storage for computing workloads on the computing nodes may be decoupled from individual computing nodes, in comparison to conventional architectures for computing clusters and storage clusters in cloud networks, enabling storage to be scaled without static allocations.

EXAMPLE CLAUSES

A. A method comprising: translating, by a local file system running on a computing node of a cloud network, a random-access file write operation call referencing data to be written to a local file to a first append operation call targeting a distributed file system ("DFS") hosted on a plurality of storage nodes of the cloud network; creating, by the local file system, a mapping between the local file and an append location received from the DFS; and recording, by the local file system, the mapping between the local file and the append location by a second append operation call targeting the DFS.

B. The method as paragraph A recites, wherein the random-access file write operation call comprises a file write operation application programming interface ("API") call configured to write data to an offset of the local file.

C. The method as paragraph A recites, wherein the DFS is implemented by an append-only file system.

D. The method as paragraph C recites, wherein the DFS performs the first append operation call and the second append operation call by writing an append to a sequential data structure.

E. The method as paragraph A recites, further comprising looking up, by the local file system, a mapping between the local file and an append location at the DFS, the local file comprising data to be read referenced by a random-access file read operation call.

F. The method as paragraph E recites, wherein the random-access file read operation call comprises a file read operation application programming interface ("API") call configured to read data from an offset of the local file.

G. The method as paragraph E recites, further comprising translating, by the local file system, the file read operation call to an append read operation call targeting the append location at the DFS.

H. A method comprising: determining, by a local file system running on a computing node of a cloud network, existing local files in a namespace of the local file system; looking up, by the local file system, mappings between the existing local files and append locations of a first sequential data structure at a distributed file system ("INS") hosted on a plurality of storage nodes of the cloud network; and causing, by the local file system, the DFS to write a second sequential data structure comprising data referenced by each append location to which each existing local file is mapped by a file copy operation call targeting the DFS.

I. The method as paragraph H recites, further comprising causing, by the local file system, the DFS to update each mapping between an existing local file and an append location of the first sequential data structure to a mapping between the existing local file and an append location of the second sequential data structure.

J. The method as paragraph I recites, further comprising causing, by the local file system, the DFS to free storage occupied by the first sequential data structure.

K. A system of a cloud network, comprising: one or more processors; and memory communicatively coupled to the one or more processors, the memory storing computer-executable modules executable by the one or more processors that, when executed by the one or more processors, perform associated operations, the computer-executable modules comprising: a write translating module configured to translate a random-access file write operation call referencing data to be written to a local file to a first append operation call targeting a distributed file system ("DFS") hosted on a plurality of storage nodes of the cloud network; a mapping module configured to create a mapping between the local file and an append location received from the DFS; and a mapping recording module configured to record the mapping between the local file and the append location by a second append operation call targeting the DFS.

L. The system as paragraph K recites, wherein the random-access file write operation call comprises a file write operation application programming interface ("API") call configured to write data to an offset of the local file.

M. The system as paragraph K recites, wherein the DFS is implemented by an append-only file system.

N. The system as paragraph M recites, wherein the DFS performs the first append operation call and the second append operation call by writing an append to a sequential data structure.

O. The system as paragraph K recites, further comprising a mapping lookup module configured to look up a mapping between the local file and an append location at the DFS, the local file comprising data to be read referenced by a random-access file read operation call.

P. The system as paragraph O recites, wherein the random-access file read operation call comprises a file read operation application programming interface ("API") call configured to read data from an offset of the local file, and originates from one of: the system, and a second system of the cloud network.

Q. The system as paragraph O recites, further comprising a read translating module configured to translate the file read operation call to an append read operation call targeting the append location at the DFS.

R. A computer-readable storage medium storing computer-readable instructions executable by one or more processors, that when executed by the one or more processors, cause the one or more processors to perform operations comprising: translating, by a local file system running on a computing node of a cloud network, a random-access file write operation call referencing data to be written to a local file to a first append operation call targeting a distributed file system ("DFS") hosted on a plurality of storage nodes of the cloud network; creating, by the local file system, a mapping between the local file and an append location received from the DFS; and recording, by the local file system, the mapping between the local file and the append location by a second append operation call targeting the DFS.

S. The computer-readable storage medium as paragraph R recites, wherein the random-access file write operation call comprises a file write operation application programming interface ("API") call configured to write data to an offset of the local file.

T. The computer-readable storage medium as paragraph R recites, wherein the DFS is implemented by an append-only file system.

U. The computer-readable storage medium as paragraph T recites, wherein the DFS performs the first append operation call and the second append operation call by writing an append to a sequential data structure.

V. The computer-readable storage medium as paragraph R recites, wherein the operations further comprise looking up, by the local file system, a mapping between the local file and an append location at the DFS, the local file comprising data to be read referenced by a random-access file read operation call.

W. The computer-readable storage medium as paragraph V recites, wherein the random-access file read operation call comprises a file read operation application programming interface ("API") call configured to read data from an offset of the local file.

X. The computer-readable storage medium as paragraph V recites, wherein the operations further comprise translating, by the local file system, the file read operation call to an append read operation call targeting the append location at the DFS.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    translating, by a local file system running on a computing node of a cloud network, a random-access file write operation call referencing data to be written to a local file to a first append operation call targeting a distributed file system ("DFS") hosted on a plurality of storage nodes of the cloud network, at least some of the plurality of storage nodes being decoupled from the computing node to enable scaling storage without static allocations;
    creating, by the local file system, a mapping between the local file and an append location received from the DFS;
    recording, by the local file system, the mapping between the local file and the append location by a second append operation call targeting the DFS; and
    performing, by the local file system, storage reclamation upon the DFS in response to determining that one or more trigger conditions are triggered, the one or more trigger conditions including that a total occupied storage space distributed over one or more of the storage nodes and locally organized into the DFS exceeds a preset threshold ratio of a total size of local files.

2. The method of claim 1, wherein the random-access file write operation call comprises a file write operation application programming interface ("API") call configured to write data to an offset of the local file.

3. The method of claim 1, wherein the DFS performs the first append operation call and the second append operation call by writing an append to a sequential data structure, and the DFS is configured to receive additional first append operation calls and additional second append operation calls from a plurality of computing nodes of the cloud network.

4. The method of claim 1, further comprising executing, by the computing node, a computing workload instruction configured to send a native append operation call targeting the DFS bypassing the local file system, and the DFS performs the native append operation call by writing an append to a sequential data structure.

5. The method of claim 1, further comprising looking up, by the local file system, the mapping between the local file and the append location at the DFS, the local file comprising data to be read referenced by a random-access file read operation call.

6. The method of claim 5, wherein the random-access file read operation call comprises a file read operation application programming interface ("API") call configured to read data from an offset of the local file.

7. The method of claim 6, further comprising translating, by a local file system, the file read operation API call to an append read operation call targeting the append location at the DFS.

8. A system of a cloud network, comprising:
    one or more processors; and
    memory communicatively coupled to the one or more processors, the memory storing computer-executable modules executable by the one or more processors that, when executed by the one or more processors, cause the one or more processors to perform acts comprising:

translating a random-access file write operation call referencing data to be written to a local file to a first append operation call targeting a distributed file system ("DFS") hosted on a plurality of storage nodes of the cloud network, at least some of the plurality of storage nodes being decoupled from a computing node to enable scaling storage without static allocations;

creating a mapping between the local file and an append location received from the DFS; and recording the mapping between the local file and the append location by a second append operation call targeting the DFS.

9. The system of claim 8, wherein the random-access file write operation call comprises a file write operation application programming interface ("API") call configured to write data to an offset of the local file.

10. The system of claim 8, wherein the DFS performs the first append operation call and the second append operation call by writing an append to a sequential data structure, and the DFS is configured to receive additional first append operation calls and additional second append operation calls from a plurality of computing nodes of the cloud network.

11. The system of claim 8, wherein the acts further comprise sending a native append operation call targeting the DFS bypassing a local file system, and the DFS performs the native append operation call by writing an append to a sequential data structure.

12. The system of claim 8, wherein the acts further comprise looking up the mapping between the local file and the append location at the DFS, the local file comprising data to be read referenced by a random-access file read operation call.

13. The system of claim 12, wherein the random-access file read operation call comprises a file read operation application programming interface ("API") call configured to read data from an offset of the local file.

14. The system of claim 13, wherein the acts further comprise translating the file read operation API call to an append read operation call targeting the append location at the DFS.

15. One or more non-transitory computer-readable storage media storing computer-readable instructions executable by one or more processors, that when executed by the one or more processors, cause the one or more processors to perform operations comprising:

translating, by a local file system running on a computing node of a cloud network, a random-access file write operation call referencing data to be written to a local file to a first append operation call targeting a distributed file system ("DFS") hosted on a plurality of storage nodes of the cloud network, at least some of the plurality of storage nodes being decoupled from the computing node to enable scaling storage without static allocations;

creating, by the local file system, a mapping between the local file and an append location received from the DFS;

recording, by the local file system, the mapping between the local file and the append location by a second append operation call targeting the DFS; and performing, by the local file system, storage reclamation upon the DFS in response to determining that one or more trigger conditions are triggered.

16. The one or more non-transitory computer-readable storage media of claim 15, wherein the random-access file write operation call comprises a file write operation application programming interface ("API") call configured to write data to an offset of the local file.

17. The one or more non-transitory computer-readable storage media of claim 15, wherein the DFS performs the first append operation call and the second append operation call by writing an append to a sequential data structure, and the DFS is configured to receive additional first append operation calls and additional second append operation calls from a plurality of computing nodes of the cloud network.

18. The one or more non-transitory computer-readable storage media of claim 15, wherein the operations further comprise executing, by a computing node, a computing workload instruction configured to send a native append operation call targeting the DFS bypassing the local file system, and the DFS performs the native append operation call by writing an append to a sequential data structure.

19. The one or more non-transitory computer-readable storage media of claim 15, wherein the operations further comprise looking up, by the local file system, a mapping between the local file and an append location at the DFS, the local file comprising data to be read referenced by a random-access file read operation call.

20. The one or more non-transitory computer-readable storage media of claim 19, wherein the operations further comprise translating, by the local file system, a file read operation call to an append read operation call targeting the append location at the DFS.

* * * * *